United States Patent [19]
Daskalon et al.

[11] 3,880,662
[45] Apr. 29, 1975

[54] PORCELAIN MIX FOR DENTAL APPLIANCES

[75] Inventors: Leonard G. Daskalon, Orange, Conn.; Constantine I. Courduvelis, Athens, Greece; Theodore Koukos, West Haven, Conn.

[73] Assignee: B.D.K. Ltd., Inc., New Haven, Conn.

[22] Filed: Jan. 8, 1973

[21] Appl. No.: 321,833

[52] U.S. Cl. .............................. 106/35; 32/2; 32/8; 32/12; 106/45
[51] Int. Cl. ............................................. C09k 3/00
[58] Field of Search ................ 106/35, 45, 46, 73.4; 32/2, 8, 12

[56] References Cited
UNITED STATES PATENTS

| | | | |
|---|---|---|---|
| 2,635,058 | 4/1953 | Wooldridge | 106/45 |
| 3,238,049 | 3/1966 | Somers | 106/39 |
| 3,400,097 | 9/1968 | Weinstein et al. | 32/8 |
| 3,519,593 | 7/1970 | Bolger | 260/41.5 R |

OTHER PUBLICATIONS

Rose, "The Condensed Chemical Dictionary," Reinhold Pub. Co., New York, 1956, p. 887.

*Primary Examiner*—Joseph L. Schofer
*Assistant Examiner*—P. R. Michl
*Attorney, Agent, or Firm*—Steward & Steward

[57] ABSTRACT

An improved vitrifiable porcelain mix is disclosed for use by dental technicians in building dental appliances such as artificial teeth, crowns, bridges, pontics and the like. The mix is characterized by the substitution, for all or part of the distilled water normally used in forming a porcelain powder slurry or mix, of certain polyhydric alcohols and ethers of alcohols.

8 Claims, No Drawings

PORCELAIN MIX FOR DENTAL APPLIANCES

BACKGROUND OF THE INVENTION

This invention relates to porcelain mixes or slurries of the type employed by dental technicians in making dental appliances such as crowns, bridges, pontics, veneers and similar dental restorations. The present invention is directed more particularly to mixes of regular dental porcelain powder with an organic liquid binding agent of special properties, whereby to facilitate the application by the dental technician of the porcelain mix to the metal work serving as the foundation for the dental appliance.

It has been the standard practice for many years to employ water as the temporary binding agent for porcelain powders in the preparation of vitrifiable enameling mixes used in coating the metal castings employed as foundations for artificial teeth. All of the commercial dental type porcelain powders as furnished by well known manufacturers are divided into color or shade types which have been carefully standardized by each manufacturer to attain exact color reproducibility requirements. Each manufacturer supplies a shade guide for its product to help the dentist and dental technician in selecting the proper shade most nearly matching a patient's existing natural teeth. These guides, and the porcelain material used in conformity with these guides, are made on the basis of using water in preparing the porcelain mix, and generally distilled water is specified to further reduce the chance of some contamination that will adversely affect the carefully controlled color or shade patterns. The use of water in forming a slurry of porcelain powder has thus come to be standard practice in the art, notwithstanding certain objections and disadvantages which water introduces. One of the chief of these is that water tends to dry out too rapidly from the powder-water mix. For example, the average working time of a prepared water base enamel mix is from as short as 5 to possibly as much as 15 minutes, with the average being more usually 10–12 minutes. This becomes a very significant problem where the technician is building a multi-unit appliance, such as a bridgework consisting of two or more teeth. The problem here is that portions of the porcelain mix first applied to one part of the metal foundation of the bridgework dry out and become fragile and easily chipped or cracked in the further handling of the metal foundation during application of porcelain to other areas of the bridge. When an attempt is made to mix more water with the porcelain to form a wetter consistency of slower drying properties, the composition becomes loose or watery and of poor adhesive properties, making it difficult to apply to most surfaces without encountering run-off. This run-off may not show up significantly until after firing to vitrify the enamel. In such case a second application of porcelain and re-firing then becomes necessary. Such repair or patching is not only time-consuming, but re-firing can weaken or otherwise deteriorate the first-applied porcelain, as by turning it glassy and objectionable for cosmetic reasons in artificial teeth.

Difficulty is also occasioned with water slurries of porcelain powder during the process of vibration or compaction of the enameling mix, as it is applied by the technician to the metal foundation, in order to insure that the porcelain forms a good, strong, homogeneous body, and that it bonds completely during firing with the metal foundation to which it is applied. This vibration or compacting of course can cause cracking of previously applied portions of the porcelain which have become too dry and fragile. Notwithstanding these disadvantages, water is still the only binding agent in general use by dental technicians for preparing porcelain mixes.

It has now been found that the problems involved in using water as the temporary or transient binding agent in preparing these dental mixes can be eliminated or substantially overcome by substituting, for some or all of the water, certain organic liquids. These liquids are all characterized by having boiling temperatures higher than that of water; further, and most significantly, that they evaporate without leaving any residue which interferes with the final tooth structure or its cosmetic appearance. With such mixes, their working time, that is the time period within which they must be used after preparation, becomes virtually indefinite, providing the technician with much greater flexibility of operation.

The organic binding agents found to be effective for the purposes of this invention appear to fall in two groups, one of these being the lower alkyl polyhydric alcohols, the other being lower alkyl ethers of alcohols.

The polyhydric alcohols have a generic structure as follows:

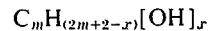

where $m$ may be 2 through 6 and $x$ may be 2 through 4.

In the case of the ethers, the generic formula for these is:

where R is a lower alkyl group of the generic structure $[C_aH_{2a+1}]$; R' is hydrogen or the same as R; and where $n$ is 1 through 3, and $a$ is 1 through 6.

These organic liquids may be completely substituted for water with the usual porcelain powders commercially sold for dental work; mixtures of these organic liquids can also be employed; or combinations of the individual organic liquids, or mixtures of such liquids, with water are also possible. In general it is found that partial replacement of water by one or more of the organic liquids is preferred.

Examples of suitable members of the class of polyhydric alcohols include 1,3-propanediol, 1,4-butanediol, 1,3-butanediol, 1,3-methylpropanediol, 2,3-butanediol, 2,4-methylbutanediol, pentaerythritol, 1,5-pentanediol. Examples of the class of lower alkyl ethers of alcohols include methoxyethoxy ethanol (methyl "Carbitol"), butoxyethoxy ethanol (butyl "Carbitol"), ethoxy ethanol, butoxy ethanol, and bis-[2-methoxyethoxyethyl]ether. Of these, the butane- and pentanediols, the butoxyethanols, and the methoxyethoxyethyl ether appear to be the most satisfactory.

Such organic liquids are useful with any of the existing commercial dental porcelain powder frits used by dental technicans. Typical compositions are disclosed in U.S. Pat. Nos. 3,052,982, 3,052,983 and 3,400,097. These frits typically comprise mixtures of vitrifiable metallic oxides predominating in silica and aluminum oxide, with varying lesser amounts of calcium, magnesium, boron, sodium and potassium oxides.

In the following examples, certain formulations are given to illustrate preferred embodiments of the invention. It is understood, however, that variations from these specific formulations can be made without departing from the scope of the invention as defined in the appended claims.

EXAMPLE 1

Commercial dental porcelain powder, for example "BF Vacuum Porcelain No. 89159" (Ceramco, Inc., Long Island City, N.Y.), is placed in a clean crucible. About 0.8 to 1.0 gram is a satisfactory quantity for preparation at one time for a single tooth metal foundation.

To this powder is then added several drops (about 0.1–0.2 milliliters) of 1,3-butanediol, together with about twice as much distilled water. This is mixed with the powder to a smooth, creamy, homogenous, thixatropic consistency which can be easily lifted on a small pencil-type camel hair brush or other suitable instrument.

This mix is then applied by a technician to the metalwork constituting the foundation of a dental appliance, using the brush to dab or vibrate and compact the mix onto the surface to be covered. After application, the coating may be blotted with absorbent tissue or cloth to smooth it and reduce any run-off. The occurrence of run-off however is substantially eliminated by comparison with a conventional water mix.

The dental piece is then dried, as by placing it near the open door of a firing furnace for a few minutes, or by an infra red lamp and forced draft for 10–12 minutes. Complete drying before firing is essential. When fully dried, as evidenced by a chalky appearance, it is moved progressively into the furnace which is maintained at around 1200°F. Vacuum is applied to the furnace, and the temperature increased at the rate of 90°–100°F. per minute until reaching a temperature of 1700°–1750°F. At this time the vacuum seal is opened and the firing continued under atmospheric conditions at the same rate until the vitrification is suitably completed. Usually this will occur at around 1820°–1850°F. The work is then removed from the furnace and allowed to cool.

The porcelain mix here described has good color stability, in that it does not change the color of powder mixes incorporating standard coloring or tinting agents employed to match the coloring of existing natural teeth of the person for whom the appliance is made. Since these colorations are standardized as mentioned above, it is most important that the liquid slurrying agent not adversely affect the color characteristic of the commercial porcelain powder.

The use of butanediol as the liquid binder provides a mix of very good consistency for ease of application, and affords the dental technician virtually unlimited working time without running into problems of the enameling mix drying out and cracking off before the dental appliance is ready for firing.

The isomers of the foregoing butanediol material may also be used alone or in combination in preparing a mix. All are at least somewhat miscible with water; working times will vary.

EXAMPLE 2

The same procedure is followed as in Example 1, except that the mix employed consists of approximately 1 gram of porcelain powder, three drops (0.2 ml.) of 2-butoxy ethanol and an equal volume of distilled water.

The resulting mix has excellent consistency for application to the dental appliance. After application to the dental metalwork, such a composition requires a preliminary drying time in atmosphere of about 5 to 10 minutes in front of the firing kiln. Alternatively it may be pre-dried for firing in the kiln by using an infrared heater and low velocity fan, which procedure affords somewhat better control. Its color stability on firing is good to excellent in comparison with that of a straight water mix.

EXAMPLE 3

Again the same procedure is followed using in this case 1,5-pentanediol and water in a ratio of 1:2 as the liquid component of the mix. The resulting mix has an excellent, rather viscous consistency which is preeminently suitable for ease of application. The pre-firing drying time of a dental appliance enameled with this mix is from 10 to 15 minutes (infrared plus forced air). Color accuracy of the resulting structure is good to very good, by comparison with a mix using only water.

Use of 1,4-pentanediol, as well as the 1,2- and 2,3-isomers, in place of the isomer named above gives equally good results.

EXAMPLE 4

The same procedure is followed again, using as the liquid component bis-[2-methoxyethoxyethyl] ether and an equal volume of distilled water. This mix provides a consistency which is rated as very good to excellent by comparison with a water mix. Again, the pre-firing drying time required is 10 to 15 minutes before placing the appliance into the high temperature zone of the kiln. The resulting vitrified enamel has good to very good color accuracy in comparison to a straight water mix.

The ether may be partially replaced by a different organic liquid such as the butanediol of Example 1, without adverse effect on consistency or color accuracy of the vitrified enamel.

EXAMPLE 5

The foregoing procedure is followed using a mix of porcelain powder and 2-(2-methoxyethoxy) ethanol (Methyl "Carbitol"). A volume ratio of 1:1 of the organic with water is employed which given an excellent thixatropic mix. Drying time preliminary to firing is 12 to 15 minutes under an infrared heat lamp and low velocity fan. The "working" time of the mix is also excellent, far exceeding that of a conventional water base mix, thus avoiding that shortcoming in the conventional mix.

A mix prepared from equal volume parts of Methyl "Carbitol" and 1,3-butanediol with three parts water gives excellent consistency, satisfactory drying time (12–15 minutes under the same conditions described above), and excellent color accuracy of the finished product.

Butoxyethoxy ethanol (Butyl "Carbitol") may also be employed alone, with water or in admixture with butanediol, as the liquid vehicle in the porcelain mix.

The following tabulation summarizes the results from other combinations of porcelain powder and liquid agent that have been tried.

Table I

| Liquid Component | Consistency | Color Accuracy | Remarks |
| --- | --- | --- | --- |
| ethylene glycol | G - VG | P | Noticable color change |
| ethyl malonate | P - F | P | Noticable color change; little improvement in working time |
| amyl alcohol | VP - P | P | Bad odor, in addition to color change |
| benzaldehyde | VP | P | Color variation; not miscible with water |
| butyl alcohol | — | — | Will not make a workable slurry |
| diethanomide | VG - E | VP | Color accuracy non-uniform |
| mesityl oxide | P | P | Will not admix with water |
| cinnamaldehyde | P | P | Loses all color; not miscible with water |
| nitrobenzene | P | F - G | Bad odor; not miscible with water; color accuracy poor |
| 2-ethoxyethanol | E | P - G | Slight odor; lightens color |
| anisole | VP | — | Objectionable odor |
| 1,3-propane diol | VG | P - F | Requires water dilution to reduce viscosity |

G - good; VG - very good; E - excellent; F - fair; P - poor.

All of the organic agents mentioned specifically as being especially suitable have some appreciable solubility or miscibility with water, and this is preferred inasmuch as it gives the dental technician an easy way to adjust the consistency of the original mix, as well as the pre-firing drying time of the applied enameling coat, by varying the proportion of water to organic. Such variation can be quite wide, as for example a mix prepared with a liquid consisting of up to 95 percent water and only 5 percent organic agent on a weight basis. This compatability of the organic agent with water, as well as with the standardized commercial porcelain powders without adversely affecting the color or strength of the resulting enamel, thus affords great flexibility of operation without criticality.

The process of covering a metal base dental piece usually involves progressive coating steps using porcelain mixes especially formulated for initially opaquing the entire piece to hide the metal, followed by coating the main tooth body and the incisal portions separately to give a more natural appearance. In the successive applications of porcelain mixes, with intermediate firing operations, it is sometimes difficult for the technician to determine how much mix he is actually applying. In order to assist in determining the amount of secondary coating being applied, it has been found that a small amount of iodine can be incorporated in a "body" or "incisal" mix prepared with organic liquids of the present invention. The color thus imparted will enable the technician to differentiate more readily between the body and incisor coatings during application. When the work is fired, however, the iodine is readily evaporated, leaving the color accuracy of the finished tooth unaffected.

What is claimed is:

1. A fluid mix for use in coating metal members of a dental appliance to provide thereon, after firing to effect vitrification of the mix, an adherent porcelain covering on said base metal member, said mix being composed of dental porcelain powder in predominant amount and a transient organic liquid binding agent in sufficient amount to render said mix of thixatropic, viscous consistency which adheres well to a dental appliance, said liquid binding agent consisting of from 0 to 95 percent by weight water, the balance being an organic liquid from the group consisting of 1,3-propanediol, 1,4-butanediol, 1,3-buntanediol, 1,3-methylpropanediol, 2,3-butanediol, 2,4-methylbutanediol, pentaerythritol, 1,5-pentanediol, methoxyethoxy ethanol, butoxyethoxy ethanol, ethoxy ethanol, butoxy ethanol, bis-[2-methoxyethoxy ethyl] ether, and combinations thereof.

2. A porcelain mix as defined in claim 1, wherein the ratio of powder to liquid is in the range of about 0.8–1.0 grams to 0.1–0.2 milliliters.

3. A porcelain mix as defined in claim 1, which consists essentially of porcelain powder and equal volumes of bis-[2-methoxyethoxyethyl] ether and water.

4. A porcelain mix as defined in claim 1, which consists essentially of porcelain powder and equal volumes of pentanediol and water.

5. A porcelain mix as defined in claim 1, which consists essentially of porcelain powder and a mixture of one part by volume pentanediol and two parts by volume water.

6. A porcelain mix as defined in claim 1, which consists essentially of porcelain powder and equal volumes of 2-butoxy ethanol and water.

7. A porcelain mix as defined in claim 1, which consists essentially of porcelain and equal volumes of methoxyethoxy or butoxyethoxy ethanol and water.

8. A porcelain mix as defined in claim 1, which consists essentially of porcelain powder and equal volumes of methoxyethoxy or butoxyethoxy ethanol and butanediol, with three volumes of water.

* * * * *